(12) United States Patent
Li et al.

(10) Patent No.: US 11,694,825 B2
(45) Date of Patent: Jul. 4, 2023

(54) RADIAL-LEADED OVER-CURRENT PROTECTION DEVICE

(71) Applicant: Polytronics Technology Corp., Hsinchu (TW)

(72) Inventors: Feng Ji Li, Taoyuan (TW); Yi-Hsuan Lee, Taichung (TW); Yung Hsien Chang, Douliu (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 17/471,890

(22) Filed: Sep. 10, 2021

(65) Prior Publication Data

US 2022/0399142 A1 Dec. 15, 2022

(30) Foreign Application Priority Data

Jun. 10, 2021 (TW) .................................. 110121151

(51) Int. Cl.
*H01C 7/02* (2006.01)
*H02H 9/02* (2006.01)
*H01C 1/14* (2006.01)

(52) U.S. Cl.
CPC ........... *H01C 7/021* (2013.01); *H01C 1/1406* (2013.01); *H01C 7/028* (2013.01); *H02H 9/026* (2013.01)

(58) Field of Classification Search
CPC ...... H01C 7/021; H01C 1/1406; H01C 7/028; H02H 9/026
See application file for complete search history.

(56) References Cited

U.S. PATENT DOCUMENTS

| 4,972,067 A * | 11/1990 | Lokar ...................... H05B 3/14 |
| | | 219/505 |
| 2008/0308971 A1* | 12/2008 | Liu ......................... B82Y 10/00 |
| | | 264/293 |

(Continued)

FOREIGN PATENT DOCUMENTS

| CN | 108879000 A | * 11/2018 | .......... H01M 10/425 |
| CN | 107464732 B | * 1/2020 | ........... H01H 69/022 |

OTHER PUBLICATIONS

CN108879000 machine translation. (Year: 2018).*
CN107464732 machine translation. (Year: 2020).*

*Primary Examiner* — Kyung S Lee
(74) *Attorney, Agent, or Firm* — Muncy, Geissler, Olds & Lowe, P.C.

(57) ABSTRACT

A radial-leaded over-current protection device comprises a PTC element, a first electrode lead, a second electrode lead and an electrically insulating encapsulation layer. The PTC element comprises a first conductive layer, a second conductive layer and a PTC material layer laminated therebetween. The PTC material layer comprises crystalline polymer and conductive filler dispersed therein. The first electrode lead has an end connecting to the first conductive layer, whereas the second electrode lead has an end connecting to the second conductive layer. The electrically insulating encapsulation layer includes a fluorine-containing polymer, and wraps around an entire outer surface of the PTC element and the ends of the first and second electrodes connecting to the PTC element. The electrically insulating encapsulation layer has a thickness of $10^2 \sim 10^5$ nm, and the radial-leaded over-current protection device has an initial resistance $R_{bf}$ of $0.0017 \sim 0.0027\Omega$.

12 Claims, 2 Drawing Sheets

(56) References Cited

U.S. PATENT DOCUMENTS

| | | | |
|---|---|---|---|
| 2013/0200988 A1* | 8/2013 | Lo .......................... | H01C 7/027 |
| | | | 338/22 R |
| 2015/0155080 A1* | 6/2015 | Chu ..................... | H01C 1/1406 |
| | | | 338/22 R |
| 2016/0042845 A1* | 2/2016 | Das .................. | H01C 17/06526 |
| | | | 252/512 |

* cited by examiner

RADIAL-LEADED OVER-CURRENT PROTECTION DEVICE

BACKGROUND OF THE INVENTION

(1) Field of the Invention

The present application relates to a radial-leaded over-current protection device, and more particularly, to a radial-leaded over-current protection device with low initial resistance and superior resistance repeatability.

(2) Description of the Related Art

Because the resistance of conductive composite materials having a positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at normal temperatures, so that the circuit or cell can operate normally. However, when an over-current or an over-temperature event occurs in the circuit or cell, the resistance will instantaneously increase to a high resistance state (e.g. at least above $10^4\Omega$), which is the so-called trip. Therefore, the over-current will be eliminated so as to protect the cell or the circuit device.

A known PTC material usually uses carbon black as conductive filler which is evenly dispersed in crystalline polymer. In this crystalline structure, the carbon black particles are usually aligned at grain boundaries and are arranged closely. Accordingly, current can flow through the insulating crystalline polymer through such "carbon black chains." At normal temperatures such as room temperature, numerous carbon chains exist in the polymer and constitute conductive paths.

When the current makes the temperature of device increase to a temperature exceeding the phase transition temperature such as the melting point of the polymer, the polymer expands to change the crystalline state to amorphous state. As such, the carbon chains are broken and thus current is not allowed to pass therethrough, and as a consequence, the resistance increases instantaneously. The phenomenon of instant increase of resistance is the so-called "trip."

When the temperature decreases to below the phase transition temperature, the polymer is re-crystallized and the conductive carbon black chains are rebuilt. However, the polymer cannot be fully recovered after expansion so that the carbon chains cannot sustain original conductivity and the resistance cannot return to initial low resistance. After tripping many times, the resistance may increase significantly, resulting in poor resistance recovery or poor resistance repeatability.

Traditionally, to solve the problem of poor resistance recovery or repeatability, one solution is provided by forming an epoxy encapsulation layer around the radial-leaded over-current protection device, wherein the epoxy encapsulation layer is the material like or similar to those conventionally used to encapsulate electronic devices, so as to avoid water and oxygen entering the device or influencing electrical properties of the device. However, electronic apparatuses are being made smaller as time goes on. Therefore, it is required to extremely restrict the sizes or thicknesses of active and passive devices. If an epoxy encapsulation layer is formed around the radial-leaded over-current protection device, the epoxy encapsulation layer will have a thickness of at least 2 mm. Such an encapsulation layer having a thick thickness is not suitable for small-sized radial-leaded over-current protection device.

In addition, to form the epoxy encapsulation layer, the radial-leaded over-current protection device has to be coated with epoxy powders first to allow epoxy powders be adhered to an entire outer surface of a PTC element of the radial-leaded over-current protection device, and a 140° C. high-temperature curing step is performed thereafter to have the epoxy powders be cured and hardened to become an encapsulation layer around and over the outer surface of the PTC element. However, there is no doubt that the high-temperature curing step will increase resistance of the PTC element. As a consequence, the radial-leaded over-current protection device will have a high initial resistance.

Furthermore, in terms of water and oxygen blocking ability, epoxy material cannot be satisfied in many applications. Therefore, there is a need to provide an encapsulation material formed on outer surface of the radial-leaded over-current protection device in which the encapsulation material makes the device have a superior resistance recovery and/or resistance repeatability and an excellent endurable current per unit area of the device.

SUMMARY OF THE INVENTION

To solve aforementioned problems, the present invention provides a radial-leaded over-current protection device including an electrically insulating encapsulation layer on an entire outer surface of a PTC element of the device. The electrically insulating encapsulation layer can avoid water and oxygen entering the device. Because the electrically insulating encapsulation layer is very thin in thickness, the radial-leaded over-current protection device is particularly suitable in applications for small-sized electronic products. The radial-leaded over-current protection device of the present invention has a low initial resistance, a superior resistance recovery and an excellent endurable current per unit area of the device. In addition, it is quite easy to form the electrically insulating encapsulation layer, and thus the manufacturing cost of the device is reduced, and increase of resistance due to a high-temperature curing step can be avoided.

In accordance with an aspect of the present application, the present application provides a radial-leaded over-current protection device comprising a PTC element, a first electrode lead, a second electrode lead and an electrically insulating encapsulation layer. The PTC element comprises a first conductive layer, a second conductive layer and a PTC material layer laminated therebetween. The PTC material layer comprises crystalline polymer and conductive filler dispersed therein. The first electrode lead has an end connecting to the first conductive layer, whereas the second electrode lead has an end connecting to the second conductive layer. The electrically insulating encapsulation layer includes a fluorine-containing polymer, and wraps around an entire outer surface of the PTC element and the ends of the first and second electrodes connecting to the PTC element. The electrically insulating encapsulation layer has a thickness of $10^2 \sim 10^5$ nm, and the radial-leaded over-current protection device has an initial resistance $R_{bf}$ of $0.0017 \sim 0.0027\Omega$.

In an embodiment, the crystalline polymer is selected from high-density polyethylene, medium-density polyethylene, low-density polyethylene, polyethylene wax, vinyl polymer, polypropylene, polyvinyl chloride, polyvinyl fluoride, copolymer of ethylene and acrylic acid, copolymer of ethylene and acrylic resin, copolymer of olefin monomer and vinyl alcohol monomer, or the combination thereof.

In an embodiment, the conductive filler is selected from carbon black, nickel, cobalt, copper, iron, tin, lead, silver, gold, platinum, titanium carbide, tungsten carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, or the mixture, alloy, solid solution or core-shell thereof.

In an embodiment, the PTC material layer further comprises non-conductive filler selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide and the combination thereof.

In an embodiment, the first or second electrode lead is copper foil, nickel foil or nickel-plated copper foil.

In an embodiment, the fluorine-containing polymer is fluoroaliphatic polymer, fluorine-containing ethylene copolymer, fluorine-containing ethylene-vinyl ether copolymer, fluorocarbon polymer, or any mixtures thereof.

In an embodiment, the fluorine-containing polymer can be dissolved in the fluorinated ether organic solvent.

In an embodiment, the fluorinated ether organic solvent is ethyl nonafluoroisobutyl ether, ethyl nonafluorobutyl ether, methyl nonafluoroisobutyl ether, methyl nonafluorobutyl ether, or any mixtures thereof.

In an embodiment, the electrically insulating encapsulation layer further comprises a nano-filler material, and the nano-filler material is montmorillonite, silicon dioxide, aluminum dioxide, or any mixtures thereof.

In an embodiment, after being put in a high temperature and high humidity environment for 336 hours, the radial-leaded over-current protection device has a resistance recovery $R_{o\%}$ of 1.07-1.21, and an endurable current per unit area of the device of 0.85-1.10 A/mm².

In an embodiment, after being put in a high temperature and high humidity environment 40° C./95% for 336 hours, the radial-leaded over-current protection device has the resistance recovery $R_{o\%}$ of 1.07-1.09 and the endurable current per unit area of the device of 0.85-1.10 A/mm².

In an embodiment, after being put in a high temperature and high humidity environment 65° C./90% for 336 hours, the radial-leaded over-current protection device has the resistance recovery $R_{o\%}$ of 1.07-1.13 and the endurable current per unit area of the device of 0.87-1.10 A/mm².

In an embodiment, after being put in a high temperature and high humidity environment 85° C./85% for 336 hours, the radial-leaded over-current protection device has the resistance recovery $R_{o\%}$ of 1.15-1.21 and the endurable current per unit area of the device of 0.87-1.10 A/mm².

The radial-leaded over-current protection device of the present invention uses an electrically insulating encapsulation layer with very thin thickness to cover an entire outer surface of the PTC element of the device, thus being particularly suitable in applications for small-sized electronic products. The electrically insulating encapsulation layer can avoid water and oxygen entering the device, therefore the device has a low initial resistance, a superior resistance recovery and an excellent trip or endurable current per unit area of device. In the meanwhile, formation of the electrically insulating encapsulation layer does not include complicated steps. Thus, manufacturing cost of the device is reduced, and increase of resistance due to a high-temperature curing step can be avoided.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

According to the present invention, an electrically insulating encapsulation layer with a very thin thickness is used to wrap around an entire outer surface (i.e., all exterior surfaces) of a PTC element of a radial-leaded over-current protection device. The present invention is particularly suitable for applications in small-sized electronic products. The electrically insulating encapsulation layer includes a fluorine-containing polymer which avoids water and oxygen entering the device. Accordingly, the radial-leaded over-current protection device has a low initial resistance and a superior resistance recovery, thereby increasing endurable current per unit area of the device (A/mm²).

Figure 1:
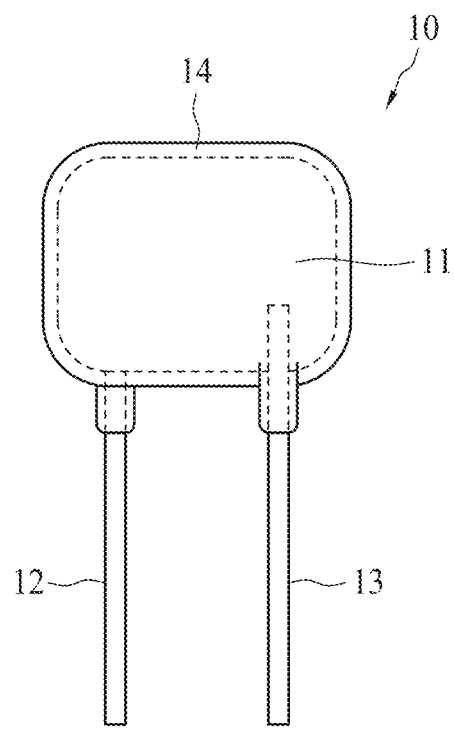
FIGS. 1 and 2 show a radial-leaded over-current protection devices in accordance with a first embodiment of the present application.
Figure 2:
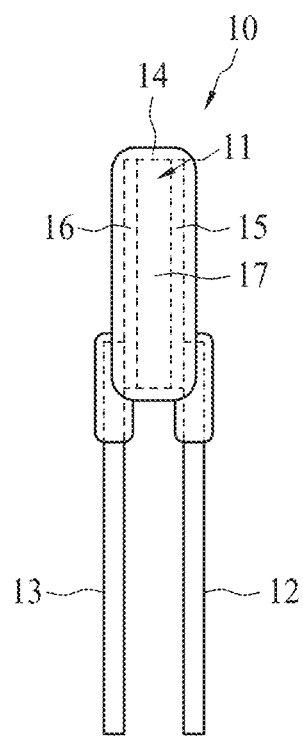

FIGS. 1 and 2 show a radial-leaded over-current protection devices in accordance with a first embodiment of the present application. FIG. 2 is a right-hand side-view of the radial-leaded over-current protection devices in FIG. 1. The radial-leaded over-current protection device 10 comprises a PTC element 11, first and second electrode leads 12 and 13, and an electrically insulating encapsulation layer 14. The PTC element 11 comprises a first conductive layer 15, a second conductive layer 16 and a PTC material layer 17 laminated therebetween. An end of the first electrode lead 12 is connected to the first conductive layer 15. Likewise, an end of the second electrode lead 13 is connected to the second conductive layer 16. The electrically insulating encapsulation layer 14 wraps around the PTC element 11 as well as the end of the first and second electrode leads 12 and 13 connecting to the PTC element 11. However, the electrically insulating encapsulation layer 14 does not wrap around the other end of the first and second electrode leads 12 and 13. The other end of the first and second electrode leads 12 and 13 is not covered by the electrically insulating encapsulation layer 14 because it is used to be welded to a circuit board, so that the radial-leaded over-current protection device 10 may function to protect an external circuit from over-current events.

Figure 3:
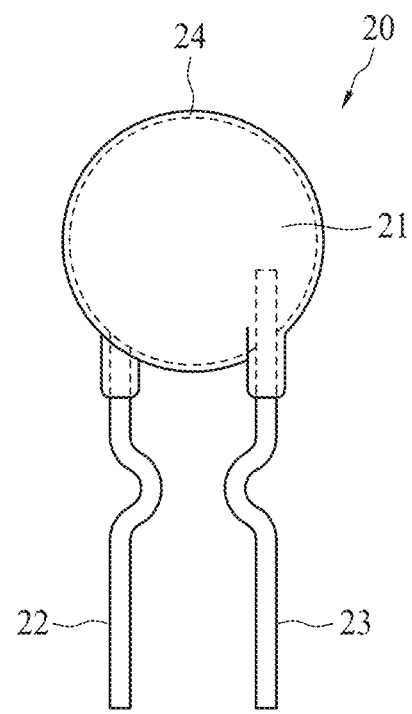
FIGS. 3 and 4 show a radial-leaded over-current protection devices in accordance with a second embodiment of the present application.
Figure 4:
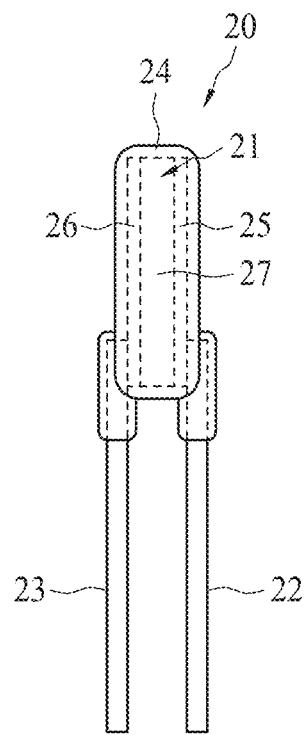

In addition to FIGS. 1 and 2, the radial-leaded over-current protection device of the present invention can have a structural design shown in FIGS. 3 and 4. FIG. 4 is a right-hand side-view of the radial-leaded over-current protection devices in FIG. 3. The radial-leaded over-current protection device 20 comprises a PTC element 21, first and second electrode leads 22 and 23, and an electrically insulating encapsulation layer 24. The PTC element 21 comprises a first conductive layer 25, a second conductive layer 26 and a PTC material layer 27 laminated therebetween. Unlike the PTC element 11 having a square shape, the PTC element 21 in FIGS. 3 and 4 is in a circular chape. Each of the electrode leads 22 and 23 has a bend as a buffer for installation and positioning.

Table 1 shows composition of the PTC material layer in accordance with Embodiments (E1-E2) of the present application and Comparative Examples (C1-C4). The PTC material layer essentially comprises crystalline polymer and conductive filler. The crystalline polymer uses high-density polyethylene (HDPE). The conductive filler uses tungsten carbide (WC) with a volume resistivity less than 500 μΩ-cm. The crystalline polymer comprises 50-60% by volume of the composition of the PTC material layer, and it may comprise 52%, 54%, 56% or 58% by volume in particular. Conductive filler may comprise 40-50% by volume of the composition of the PTC material layer, and it may comprise 42%, 44%, 46% or 48 by volume in particular. Preferably, the crystalline polymer comprises 53.5-55.5% by volume of the composition of the PTC material layer, and the conductive filler comprises 44.5-46.5% by volume of the composition of the PTC material layer. The PTC material layers in E1, C1 and C2 have the same composition, and the PTC material layers in E2, C3 and C4 have the same composition.

TABLE 1

|    | HDPE (vol %) | WC (vol %) |
|----|--------------|------------|
| E1 | 53.7         | 46.3       |
| E2 | 55.0         | 45.0       |
| C1 | 53.7         | 46.3       |
| C2 | 53.7         | 46.3       |
| C3 | 55.0         | 45.0       |
| C4 | 55.0         | 45.0       |

The manufacturing method of the radial-leaded over-current protection device 10 in FIG. 1 in accordance with Embodiments (E1-E2) of the present application and Comparative Examples (C1-C4) is given below. The people having ordinary knowledge can implement substantially equivalent or similar process to make the devices or the like. First, the raw material is set into a blender (Haake-600) at 160° C. for 2 minutes. The procedures of feeding the material having an amount, as shown in Table 1, are as follows: Crystalline polymer is first loaded into the Haake blender, and the conductive filler is then added into the blender. The rotational speed of the blender is set to 40 rpm. After blending for three minutes, the rotational speed increases to 70 rpm. After blending for seven minutes, the mixture in the blender is drained and thereby a PTC conductive composition is formed. Afterward, the above conductive composition is loaded into a mold to form a symmetrical PTC lamination structure with the following layers: steel plate/Teflon cloth/nickel foil/PTC compound (i.e., the conductive composition)/nickel foil/Teflon cloth/steel plate. The mold loaded with the conductive composition is pre-pressed for three minutes at 50 kg/cm² and 160° C. This pre-press process could exhaust the gas generated from vaporized moisture or from some volatile ingredients in the PTC lamination structure. The pre-press process could also drive the air out of the PTC lamination structure. As the generated gas is exhausted, the mold is pressed for additional three minutes at 100 kg/cm², 160° C. After that, the press step is repeated once at 150 kg/cm², 160° C. for 3 minutes to form a PTC material layer.

Next, two metal foils (i.e., conductive layers) are in physical contact with the top surface and the bottom surface of the PTC material layer, in which the two metal foils are symmetrically placed upon the top surface and the bottom surface of the PTC material layer. Each metal foil may have a rough surface with plural nodules (not shown) to physically contact the PTC material layer. Two Teflon cloths (not shown) are placed upon the two metal foils, and then two steel plates (not shown) are placed upon the two Teflon cloths. As a result, all of the Teflon cloths and the steel plates are disposed symmetrically on the top and the bottom surfaces of the PTC material layer to form a multi-layered structure. The multi-layered structure is then pressed for three minutes at 60 kg/cm² and 180° C., and is then pressed at the same pressure and at room temperature for five minutes. After pressing, the multi-layered structure is subjected to electron beam or γ-ray (Cobalt 60) radiation to form a conductive composite module. The conductive composite module may be punched to form chip-type PTC element 11 or 21 of various shapes, and then two electrode leads are connected to the PTC element 11 or 21 and the electrically insulating encapsulation layer wraps thereon to form a radial-leaded over-current protection device 10.

In order to verify initial resistance, resistance recovery and endurable current per unit area of the radial-leaded over-current protection device 10 (A/mm²), an electrically insulating encapsulation layer may be or may be not formed as desired over the outer surface of the device once it is produced. In Table 1, the PTC element 11 of the radial-leaded over-current protection device 10 in E1-E2 has an entire outer surface covered by an electrically insulating encapsulation layer 14 of the present invention, the PTC element 11 of the radial-leaded over-current protection device 10 in C1 and C3 has an entire outer surface covered by an epoxy encapsulation layer used in traditional device, and the PTC element 11 of the radial-leaded over-current protection device 10 of C2 and C4 has an entire outer surface that is not covered by any encapsulation layer. A method for forming the electrically insulating encapsulation layer 14 of the present invention is described in detail below for E1-E2.

For E1-E2, please refer to FIG. 1. The radial-leaded over-current protection device 10 in E1-E2 is immersed into a fluorine-containing polymer solution for about 1 second first, and is immediately taken out to air-dry the coating layer at room temperature, thereby the solvent in the fluorine-containing polymer solution coated on the device 10 will evaporate instantly, and thus an electrically insulating encapsulation layer 14 will be formed to wrap around the entire outer surface of the PTC element 11 as well as one end of first and second electrode leads 12 and 13 connecting to the PTC element 11. As formed, the electrically insulating encapsulation layer 14 has a thickness of $10^2$~$10^5$ nm. In E1 and E2, the fluorine-containing polymer solution includes fluoroaliphatic polymer and ethyl nonafluoroisobutyl ether, wherein fluoroaliphatic polymer and ethyl nonafluoroisobutyl ether comprises 10% and 90% by weight of the solution, respectively.

For C1 and C3, an epoxy encapsulation layer is formed on an entire outer surface of the PTC element 11 of the radial-leaded over-current protection device 10 by using traditional encapsulation method. Specifically, the radial-leaded over-current protection device 10 is inserted into a container filled with epoxy powders, and is taken out then, such that an entire outer surface of the PTC element 11 of the radial-leaded over-current protection device 10 will be coated with epoxy powders. Afterward, the radial-leaded over-current protection device 10 undergoes a 140° C. high-temperature curing step for about 2 hours, in order to make the epoxy powders adhered on the device be hardened. As a result, an epoxy encapsulation layer will be formed to wrap around the entire outer surface of the PTC element 11 as well as one end of first and second electrode leads 12 and 13 connecting to the PTC element 11. Because the encapsulation layer is made of epoxy formed by using traditional encapsulation method, the epoxy encapsulation layer has a very thick thickness which would be, in general, at least 2 mm.

As to C2 and C4, the radial-leaded over-current protection device 10 in C2 and C4 does not undergo an encapsulation wrap-around step, therefore the outer surface of the PTC element 11 does not include an encapsulation material layer or a cover layer that is formed thereon.

The PTC elements 11 and the PTC material layers 17 in both E1-E2 and C1-C4 have the same top-view area (i.e., the area of the PTC element 11 facing the paper showing FIG. 1). The PTC element 11 is basically rectangular in shape when seen from top, and has a width of 2.8 mm and a length of 3.5 mm. Therefore, the top-view area of the PTC element 11 is 2.8 mm×3.5 mm=9.8 mm².

For each of E1-E2 and C1-C4, five radial-leaded over-current protection devices are taken as samples to perform the following measurements of resistance and trip current: (1) initial resistance at room temperature, i.e., $R_b f$, before the device is put in high temperature and high humidity environment 40° C./95%, wherein the device in E1, E2, C1 and C3 performs such measurement after the electrically insulating encapsulation layer or the epoxy encapsulation layer is formed on the outer surface of the device; (2) resistance after 96 hours in high temperature and high humidity environment 40° C./95%, i.e., R_96 hr@40° C./95%; (3) resistance after 336 hours in high temperature and high humidity environment 40° C./95%, i.e., R_336 hr@40° C./95%; and (4) trip current at 25° C. after 336 hours in high temperature and high humidity environment 40° C./95%, i.e., I-trip@25° C. These values are recorded in Table 2 shown below. Moreover, a ratio of $R_{o\%}$=(R_336 hr@40° C./95%)/($R_{bf}$) is calculated. This ratio R % is defined as a resistance recovery which is used to evaluate the extent to which resistance of device recovers by comparing R_336 hr@40° C./95% with $R_{bf}$. Generally, resistance of the device will gradually increase if the device continuously operates. That is, the smaller the resistance recovery is, the less the resistance of the device increases. When $R_{o\%}$=1.0, it means that after being exposed to high temperature and high humidity environment for a period of time, the device still has the same resistance as its initial resistance $R_{bf}$ or the resistance of the device does not increase. In contrast, the larger the resistance recover is, the more the resistance of the device increases. In addition, a trip current per unit area of the device (A/mm²) is calculated based on I-trip @ 25° C. and device area (i.e., 2.8 mm×3.5 mm=9.8 mm²). The trip current per unit area of the device (A/mm²) is equivalent to the endurable current per unit area of the device (A/mm²); that is, the trip current per unit area of the device is used to evaluate endurable current per unit area of the device. Taking E1 as an example, the trip current per unit area of the device at 25° C. (A/mm²)=I_trip @ 25° C./area=10.8/9.8=1.10.

TABLE 2

| | $R_{bf}$ (Ω) | R_96 hr@40° C./95% (Ω) | R_336 hr@40° C./95% (Ω) | (R_336 hr@40° C./95%)/ ($R_{bf}$) | I-trip@25° C. (A) | I-trip@25° C./area (A/mm²) |
|---|---|---|---|---|---|---|
| E1 | 0.00179 | 0.00183 | 0.00192 | 1.07263 | 10.80 | 1.10 |
| E2 | 0.00269 | 0.00280 | 0.00293 | 1.08922 | 8.64 | 0.88 |
| C1 | 0.00300 | 0.00311 | 0.00320 | 1.06667 | 8.10 | 0.83 |
| C2 | 0.00186 | 0.00301 | 0.00335 | 1.80108 | 8.02 | 0.82 |
| C3 | 0.00321 | 0.00333 | 0.00345 | 1.07477 | 7.76 | 0.79 |
| C4 | 0.00262 | 0.00317 | 0.00368 | 1.40458 | 7.51 | 0.77 |

E1, C1 and C2 have the same composition, wherein the device in E1 includes an electrically insulating encapsulation layer formed by the present invention, the device in C1 includes an epoxy encapsulation layer formed by tradition encapsulation method, and the device in C2 does not include an encapsulation layer. Therefore, the test results in this group of samples, i.e., E1, C1 and C2, can be observed to show test result differences therebetween due to structure difference. From Table 2, it is shown that C1 has an initial resistance $R_{bf}$ greater than that of E1. This is due to a 140° C. high-temperature curing step performed for two hours on the radial-leaded over-current protection device of C1, thus making initial resistance $R_bf$ of C1 greater than that of E1. E1 and C2 have almost the same initial resistance, and therefore, it reveals that formation of an electrically insulating encapsulation layer 14 on the radial-leaded over-current protection device 10 would not make the device have a significant increased initial resistance. Also, C1 has a resistance R_96 hr@40° C./95% and a resistance R_336 hr@40° C./95% greater than those of E1. However, there is not much difference in resistance recovery $R_{o\%}$ between E1 and C1. Obviously, the device has a superior resistance recovery no matter which type of encapsulation material, e.g. an electrically insulating encapsulation layer 14 formed by the present invention or an epoxy encapsulation layer formed by traditional encapsulation method, is used to wrap around the device 10. Resistance recovery $R_{o\%}$ in E1 and C1 ranges from 1.06 to 1.08. Because the device in C2 does not include an encapsulation layer, the device in C2 has an inferior resistance recovery, which is 1.80108, as shown in Table 2. In regard to endurable current per unit area of the device, Table 2 shows that E1 has a higher endurable current per unit area of the device (A/mm²) than that of C1. Apparently, the device with the electrically insulating encapsulation layer 14 formed by the present invention can endure higher current per unit area of the device (A/mm²) than the device with epoxy encapsulation layer formed by traditional encapsulation method. As an example, Table 2 shows that the device in E1 has an endurable current per unit area of the device of 1.10 A/mm² measured at room temperature 25° C. after being exposed to high temperature and high humidity environment 40° C./95% for 336 hours.

E2, C3 and C4 have the same composition, wherein the device in E2 includes an electrically insulating encapsulation layer formed by the present invention, the device in C3 includes an epoxy encapsulation layer formed by tradition encapsulation method, and the device in C4 does not include an encapsulation layer. From Table 2, it is shown that C3 has an initial resistance $R_bf$ greater than that of E2. This is due to a 140° C. high-temperature curing step performed for two hours on the radial-leaded over-current protection device of C3, thus making initial resistance $R_bf$ of C3 greater than that of E2. E2 and C4 have almost the same initial resistance, and therefore, it reveals that formation of an electrically insulating encapsulation layer 14 on the radial-leaded over-current protection device would not make the device have a significant increased initial resistance. Also, C3 has a resistance R_96 hr@40° C./95% and a resistance R_336 hr@40° C./95% greater than those of E2. However, there is not much difference in resistance recovery $R_{o\%}$ between E2 and C3. Obviously, the device has a superior resistance recovery no matter which type of encapsulation material, e.g. an electrically insulating encapsulation layer 14 formed by the present invention or an epoxy encapsulation layer formed by traditional encapsulation method, is used to wrap around the device 10. Resistance recovery $R_{o\%}$ in E2 and C3 ranges from 1.07 to 1.09. Because the device in C4 does not include an encapsulation layer, the device in C4 has an inferior resistance recovery, which is 1.40458, as shown in Table 2. In regard to endurable current per unit area of the device, Table 2 shows that E2 has a higher endurable current per unit area of the device (A/mm$^2$) than that of C3. Apparently, the device with the electrically insulating encapsulation layer 14 formed by the present invention can endure higher current per unit area of the device (A/mm$^2$) than the device with epoxy encapsulation layer formed by traditional encapsulation method. As an example, Table 2 shows that the device in E2 has an endurable current per unit area of the device of 0.88 A/mm$^2$ measured at room temperature 25° C. after being exposed to high temperature and high humidity environment 40° C./95% for 336 hours.

Apparently, with an electrically insulating encapsulation layer formed by the present invention and wrapping around an entire outer surface of the PTC element of the radial-leaded over-current protection device, water and oxygen can be blocked entering the device. Accordingly, the device has a lower value of initial resistance $R_bf$, i.e., 0.0017-0.0027Ω, as shown in Table 2. In addition, after being exposed to high temperature and high humidity environment 40° C./95% for 336 hours, the device has a resistance recovery $R_{o\%}$ of 1.07 to 1.09, and an endurable current per unit area of the device measured at room temperature 25° C. is increased to 0.88-1.10 A/mm$^2$.

In another experimental verification test, the high temperature and high humidity environment is changed from 40° C./95% to 65° C./90%. Likewise, resistance and trip current of the radial-leaded over-current protection device for each of E1-E2 and C1-C4 are measured, and these values are recorded in Table 3 shown below. Moreover, a resistance recovery $R_{o\%}$ and a trip current per unit area of the device (A/mm$^2$) are calculated.

TABLE 3

|    | $R_{bf}$ (Ω) | R_96 hr@65° C./90% (Ω) | R_336 hr@65° C./90% (Ω) | (R_336 hr@65° C./90%)/ ($R_{bf}$) | I-trip@25° C. (A) | I-trip@25° C./area (A/mm$^2$) |
|----|------|---------|---------|---------|------|------|
| E1 | 0.00182 | 0.00189 | 0.00196 | 1.07692 | 10.32 | 1.05 |
| E2 | 0.00264 | 0.00285 | 0.00296 | 1.12121 | 8.55 | 0.87 |
| C1 | 0.00293 | 0.00292 | 0.00302 | 1.03072 | 8.46 | 0.86 |
| C2 | 0.00188 | 0.00291 | 0.00342 | 1.81915 | 7.98 | 0.81 |
| C3 | 0.00322 | 0.00330 | 0.00335 | 1.04037 | 7.78 | 0.79 |
| C4 | 0.00265 | 0.00361 | 0.00426 | 1.60755 | 6.25 | 0.64 |

The test results in Table 3 are basically similar to those in the above Table 2. That is, an electrically insulating encapsulation layer formed by the present invention and wrapping around an entire outer surface of the PTC element of the radial-leaded over-current protection device makes the device have a lower value of initial resistance $R_{bf}$, i.e., 0.0018-0.0027Ω, as shown in Table 3. In addition, after being exposed to high temperature and high humidity environment 65° C./90% for 336 hours, the device has a resistance recovery $R_{o\%}$ of 1.07-1.13, and an endurable current per unit area of the device measured at room temperature 25° C. is increased to 0.87-1.05 A/mm$^2$.

In yet another experimental verification test, the high temperature and high humidity environment is changed from 40° C./95% to 85° C./85%.

Likewise, resistance and trip current of the radial-leaded over-current protection device for each of E1-E2 and C1-C4 are measured, and these values are recorded in Table 4 shown below. Moreover, a resistance recovery $R_{o\%}$ and a trip current per unit area of the device (A/mm$^2$) are calculated.

TABLE 4

|    | $R_{bf}$ (Ω) | R_96 hr@85° C./85% (Ω) | R_336 hr@85° C./85% (Ω) | (R_336 hr@85° C./85%)/ ($R_{bf}$) | I-trip@25° C. (A) | I-trip@25° C./area (A/mm$^2$) |
|----|------|---------|---------|---------|------|------|
| E1 | 0.00183 | 0.00191 | 0.00211 | 1.15301 | 10.01 | 1.02 |
| E2 | 0.00251 | 0.00287 | 0.00302 | 1.20319 | 8.53 | 0.87 |
| C1 | 0.00272 | 0.00256 | 0.00251 | 0.92279 | 9.27 | 0.95 |
| C2 | 0.00184 | 0.00251 | 0.00360 | 1.95652 | 7.50 | 0.77 |
| C3 | 0.00292 | 0.00290 | 0.00293 | 1.00342 | 8.11 | 0.83 |
| C4 | 0.00267 | 0.00387 | 0.00433 | 1.62172 | 6.23 | 0.64 |

Table 4 shows the same test results as those in Table 2. In other words, with an electrically insulating encapsulation layer formed by the present invention and wrapping around an entire outer surface of the PTC element of the radial-leaded over-current protection device, the device has a lower value of initial resistance $R_{bf}$, i.e., 0.0018-0.0026Ω, as shown in Table 4. In addition, after being exposed to high temperature and high humidity environment 85° C./85% for 336 hours, the device has a resistance recovery R % of 1.15-1.21, and an endurable current per unit area of the device measured at room temperature 25° C. is increased to 0.87-1.02 A/mm$^2$.

The inventors of the present invention infer that it is because the temperature of 85° C. makes HDPE of PTC material layer of the device in C1 and C3 partially re-crystalize that resistance of the device is lowered. Therefore, the device in C1 and C3 has a superior resistance recovery R % and an excellent endurable current per unit area of the device.

In brief, an electrically insulating encapsulation layer formed by the present invention is used to wrap around an entire outer surface of the PTC element of the radial-leaded over-current protection device as well as one end of first and second electrode leads connecting to the PTC element. A fluorine-containing polymer solution is coated on the entire outer surface of the PTC element of the device to form the electrically insulating encapsulation layer. Because the fluorine-containing polymer has a small amount in the fluorine-containing polymer solution, the electrically insulating encapsulation layer as formed has a quite thin thickness of 10$^2$-10$^5$ nm, e.g. 10$^3$ nm or 10$^4$ nm, after the solvent evaporates. On one hand, the fluorine atoms in the fluorine-containing polymer are hydrophobic, therefore the electrically insulating encapsulation layer as formed can block water entering the device. On the other hand, the electrically insulating encapsulation layer has a certain thickness, therefore the electrically insulating encapsulation layer can prevent oxygen from entering the device. In other words, in comparison with the epoxy encapsulation layer formed by traditional encapsulation method, the electrically insulating encapsulation layer formed by the present invention has a much thinner thickness, thus being particularly suitable in applications for small-sized electronic products. Owing to the electrically insulating encapsulation layer having a certain thickness and the fluorine-containing polymer having a hydrophobic property, the electrically insulating encapsulation layer can block water and oxygen entering the PTC element of the radial-leaded over-current protection device, thus influence on electrical characteristics of the device is avoided. Also, according to the present invention, formation of the electrically insulating encapsulation layer does not include complicated steps. To form the electrically insulating encapsulation layer, the method includes only the steps of immersing the radial-leaded over-current protection device into a fluorine-containing polymer solution for about 1 second first, and immediately taking out the device to air-dry the coating layer at room temperature. After that, an electrically insulating encapsulation layer will be formed to wrap around the entire outer surface of the PTC element as well as one end of first and second electrode leads connecting to the PTC element. Unlike the epoxy encapsulation layer formed by traditional encapsulation method which includes a high-temperature curing step, the prevent invention has the advantages of significantly lowering the manufacturing cost of device, and avoiding increase of resistance due to such high-temperature curing step.

In an embodiment, the fluorine-containing polymer solution includes a fluorine-containing polymer and a fluorinated ether organic solvent which comprise 10-20% and 80-90% by weight of the solution, respectively. The fluorine-containing polymer can be dissolved in the fluorinated ether organic solvent. The fluorine-containing polymer could be fluoroaliphatic polymer, fluorine-containing ethylene copolymer, fluorine-containing ethylene-vinyl ether copolymer, fluorocarbon polymer, or any mixtures thereof. The fluorinated ether organic solvent could be ethyl nonafluoroisobutyl ether, ethyl nonafluorobutyl ether, methyl nonafluoroisobutyl ether, methyl nonafluorobutyl ether, or any mixtures thereof.

In another embodiment, the fluorine-containing polymer solution further includes a nano-filler material. The nano-filler material functions to avoid water and oxygen entering the radial-leaded over-current protection device as well. The nano-filler material could be one of montmorillonite, silicon dioxide, aluminum dioxide, or any mixtures thereof. However, because the nano-filler material cannot be dissolved in the fluorinated ether organic solvent, the nano-filler material comprises only a small amount of the fluorine-containing polymer solution. In this embodiment, the fluorine-containing polymer, the fluorinated ether organic solvent, and the nano-filler material comprise 10-20%, 70-90% and 0-10% by weight of the solution, respectively.

The PTC material layer in the above embodiments comprises crystalline polymer and conductive filler dispersed therein. The crystalline polymer may be polyolefines (e.g., high-density polyethylene (HDPE), medium-density polyethylene, low-density polyethylene (LDPE), polyvinyl wax, vinyl polymer, polypropylene, polyvinyl chloride and polyvinyl fluoride), copolymer of olefin monomer and acrylic monomer (e.g., copolymer of ethylene and acrylic acid or copolymer of ethylene and acrylic resin) or copolymer of olefin monomer and vinyl alcohol monomer (e.g., copolymer of ethylene and vinyl alcohol), and may include one or more crystalline polymer materials.

In the application of over-charge protection to lithium-ion batteries, to achieve protection at low temperature, a general PTC over-current protection device must trip at a lower temperature. Therefore, the PTC material layer used in the surface mountable over-current protection device of the present application contains a crystalline polymer with a lower melting point (e.g., LDPE), or can use one or more crystalline polymers in which at least one crystalline polymer has a melting point below 115° C. The above LDPE can be polymerized using Ziegler-Natta catalyst, Metallocene catalyst or other catalysts, or can be copolymerized by vinyl monomer or other monomers such as butane, hexane, octene, acrylic acid, or vinyl acetate. Sometimes, to achieve protection at high temperature or a specific objective, the compositions of the PTC material layer may totally or partially use crystalline polymer with high melting point; e.g., polyvinylidene fluoride (PVDF), polyvinyl fluoride (PVF), polytetrafluoroethylene (PTFE), or polychlorotrifluoro-ethylene (PCTFE).

The above crystalline polymers can also comprise a functional group such as an acidic group, an acid anhydride group, a halide group, an amine group, an unsaturated group, an epoxide group, an alcohol group, an amide group, a metallic ion, an ester group, and acrylate group, or a salt group. In addition, an antioxidant, a cross-linking agent, a flame retardant, a water repellent, or an arc-controlling agent can be added into the PTC material layer to improve the material polarity, electric property, mechanical bonding property or other properties such as waterproofing, high-temperature resistance, cross-linking, and oxidation resistance.

The conductive filler may comprise carbon black, metal powder or conductive ceramic powder. If the conductive filler is a metal powder, it could be nickel, cobalt, copper, iron, tin, lead, silver, gold, platinum, or an alloy thereof. If the conductive filler is a conductive ceramic powder, it could be titanium carbide (TiC), tungsten carbide (WC), vanadium carbide (VC), zirconium carbide (ZrC), niobium carbide (NbC), tantalum carbide (TaC), molybdenum carbide (MoC), hafnium carbide (HfC), titanium boride ($TiB_2$), vanadium boride ($VB_2$), zirconium boride ($ZrB_2$), niobium boride ($NbB_2$), molybdenum boride ($MoB_2$), hafnium boride ($HfB_2$), or zirconium nitride (ZrN). The conductive filler may be mixture, alloy, solid solution or core-shell structure of the aforesaid metal powders or conductive ceramic fillers.

The metal powder or the conductive ceramic powder used in the present application could exhibit various types, e.g., spherical, cubic, flake, polygonal, spiky, rod, coral, nodular, *staphylococcus*, mushroom or filament type, and has aspect ratio between 1 and 1000. The conductive filler may be of high structure or low structure. In general, conductive filler with high structure can improve the resistance repeatability of PTC material, and conductive filler with low structure can improve the voltage endurance of PTC material.

To increase the voltage endurance, the PTC material layer may further comprise non-conductive filler. The non-conductive filler may be selected from: (1) an inorganic compound with the effects of flame retardant and anti-arcing; for example, zinc oxide, antimony oxide, aluminum oxide, silicon oxide, calcium carbonate, boron nitride, aluminum nitride, magnesium sulfate and barium sulfate; and (2) an inorganic compound with a hydroxyl group; for example, magnesium hydroxide, aluminum hydroxide, calcium hydroxide, and barium hydroxide. The non-conductive filler is an inorganic compound which also has the function of controlling resistance repeatability.

The electrode leads may be metal foils such as copper foils, nickel foils or nickel-plated copper foils.

To sum up, the present invention uses an electrically insulating encapsulation layer to wrap around an entire outer surface of the PTC element of the radial-leaded over-current protection device as well as one end of first and second electrode leads connecting to the PTC element. A fluorine-containing polymer solution is coated on the entire outer surface of the PTC element of the device to form the electrically insulating encapsulation layer. The fluorine-containing polymer solution includes a fluorine-containing polymer and a fluorinated ether organic solvent which comprise 10-20% and 80-90% by weight of the solution, respectively. Alternatively, the fluorine-containing polymer solution may comprise the fluorine-containing polymer, the fluorinated ether organic solvent, and a nano-filler material, which comprise 10-20%, 70-90% and 0-10% by weight of the solution, respectively. The fluorine-containing polymer can be dissolved in the fluorinated ether organic solvent. The electrically insulating encapsulation layer as formed has a quite thin thickness of $10^2$-$10^5$ nm, e.g. $10^3$ nm or $10^4$ nm, thus being particularly suitable in applications for small-sized electronic products. Furthermore, the electrically insulating encapsulation layer can block water and oxygen entering the radial-leaded over-current protection device, therefore the device has a superior resistance recovery $R_{o\%}$ and an excellent endurable current per unit area of the device ($A/mm^2$). From Table 2, it is known that that, after the device is put in high temperature and high humidity environment 40° C./95% for 336 hours, the resistance recovery $R_{o\%}$ is 1.07-1.09, the endurable current per unit area of device is 0.85-1.10 $A/mm^2$. Table 3 shows that, after the device is put in high temperature and high humidity environment 65° C./90% for 336 hours, the resistance recovery $R_{o\%}$ is 1.07-1.13, and the trip or endurable current per unit area of the device is 0.87-1.10 $A/mm^2$. Table 4 shows that, after the device is put in high temperature and high humidity environment 85° C./85% for 336 hours, the resistance recover R % is 1.15-1.21, the trip or endurable current per unit area of the device is 0.87-1.10 $A/mm^2$. Normally, the device in real use will not be exposed to an environment having a temperature and a humidity that are more rigorous than those in Tables 1-4, therefore in real use, no matter what the temperature and the humidity of the environment are, the device would have a resistance recovery $R_{o\%}$ of 1.07-1.21 (e.g., 1.0, 1.13, 1.16 or 1.19), and a trip or endurable current per unit area of the device of 0.85-1.10 $A/mm^2$ (e.g., 0.90 $A/mm^2$ or 1.00 $A/mm^2$) after 336 hours in use. It is also learned from Tables 2-4 that the device has a very low initial resistance, i.e., 0.0017-0.0027Ω (e.g., 0.0019Ω, 0.0021Ω, 0.0023Ω or 0.0025Ω).

The present invention provides a radial-leaded over-current protection device including an electrically insulating encapsulation layer on an entire outer surface of the PTC element of the device. The electrically insulating encapsulation layer can avoid water and oxygen entering the device, so that the device has a low initial resistance, a superior resistance recovery and an excellent trip or endurable current per unit area of the device. Moreover, since the electrically insulating encapsulation layer has a quite thin thickness in nanometer scale, the device is particularly suitable in applications for small-sized electronic products. Furthermore, it is quite easy to form the electrically insulating encapsulation layer, and thus the manufacturing cost of the device is reduced, and increase of resistance due to a high-temperature curing step can be avoided.

The above-described embodiments of the present invention are intended to be illustrative only. Numerous alternative embodiments may be devised by persons skilled in the art without departing from the scope of the following claims.

What is claimed is:

1. A radial-leaded over-current protection device, comprising:
   a PTC element comprising comprises a first conductive layer, a second conductive layer and a PTC material layer laminated therebetween;
   a first electrode lead having an end connecting to the first conductive layer;
   a second electrode lead having an end connecting to the second conductive layer; and an electrically insulating encapsulation layer, wherein the electrically insulating encapsulation layer comprises a fluorine-containing polymer, and wraps around an entire outer surface of the PTC element and the ends of the first and second electrodes connecting to the PTC element;
   wherein the electrically insulating encapsulation layer has a thickness of $10^2$~$10^5$ nm;
   wherein the radial-leaded over-current protection device has an initial resistance $R_{bf}$ of 0.0017~0.0027Ω; and
   wherein after being put in a high temperature and high humidity environment for 336 hours, the radial-leaded over-current protection device has a resistance recovery R % of 1.07-1.21, and an endurable current per unit area of the device of 0.85-1.10 $A/mm^2$.

2. The radial-leaded over-current protection device of claim 1, wherein the crystalline polymer is selected from high-density polyethylene, medium-density polyethylene, low-density polyethylene, polyethylene wax, vinyl polymer, polypropylene, polyvinyl chloride, polyvinyl fluoride, copolymer of ethylene and acrylic acid, copolymer of ethylene and acrylic resin, copolymer of olefin monomer and vinyl alcohol monomer, or the combination thereof.

3. The radial-leaded over-current protection device of claim 1, wherein the conductive filler is selected from carbon black, nickel, cobalt, copper, iron, tin, lead, silver, gold, platinum, titanium carbide, tungsten carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, or the mixture, alloy, solid solution or core-shell thereof.

4. The radial-leaded over-current protection device of claim 1, wherein the PTC material layer further comprises non-conductive filler selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide and the combination thereof.

5. The radial-leaded over-current protection device of claim 1, wherein the first or second electrode lead is copper foil, nickel foil or nickel-plated copper foil.

6. The radial-leaded over-current protection device of claim 1, wherein the fluorine-containing polymer is fluoroaliphatic polymer, fluorine-containing ethylene copolymer, fluorine-containing ethylene-vinyl ether copolymer, fluorocarbon polymer, or any mixtures thereof.

7. The radial-leaded over-current protection device of claim 6, wherein the fluorine-containing polymer can be dissolved in the fluorinated ether organic solvent.

8. The radial-leaded over-current protection device of claim 7, wherein the fluorinated ether organic solvent is ethyl nonafluoroisobutyl ether, ethyl nonafluorobutyl ether, methyl nonafluoroisobutyl ether, methyl nonafluorobutyl ether, or any mixtures thereof.

9. The radial-leaded over-current protection device of claim 1, wherein the electrically insulating encapsulation layer further comprises a nano-filler material, and the nano-filler material is montmorillonite, silicon dioxide, aluminum dioxide, or any mixtures thereof.

10. The radial-leaded over-current protection device of claim 1, wherein after being put in a high temperature and high humidity environment 40° C./95% for 336 hours, the radial-leaded over-current protection device has the resistance recovery R % of 1.07-1.09 and the endurable current per unit area of the device of 0.85-1.10 A/mm$^2$.

11. The radial-leaded over-current protection device of claim 1, wherein after being put in a high temperature and high humidity environment 65° C./90% for 336 hours, the radial-leaded over-current protection device has the resistance recovery R % of 1.07-1.13 and the endurable current per unit area of the device of 0.87-1.10 A/mm$^2$.

12. The radial-leaded over-current protection device of claim 1, wherein after being put in a high temperature and high humidity environment 85° C./85% for 336 hours, the radial-leaded over-current protection device has the resistance recovery R % of 1.15-1.21 and the endurable current per unit area of the device of 0.87-1.10 A/mm$^2$.

\* \* \* \* \*